United States Patent [19]
Kuroda et al.

[11] Patent Number: 5,675,518
[45] Date of Patent: Oct. 7, 1997

[54] INTER-VEHICLE DISTANCE MEASURING APPARATUS AND METHOD FOR AUTOMOTIVE

[75] Inventors: Hiroshi Kuroda, Hitachi; Satoru Kuragaki, Hitachinaka, both of Japan

[73] Assignee: Hitachi, Ltd., Tokyo, Japan

[21] Appl. No.: 642,367

[22] Filed: May 3, 1996

[30] Foreign Application Priority Data

May 11, 1995 [JP] Japan ................. 7-112827

[51] Int. Cl.⁶ ............................................. G08G 1/16
[52] U.S. Cl. ............... 364/571.05; 364/426.044; 364/424.039; 340/903; 342/458; 180/168; 180/169
[58] Field of Search ................. 364/561, 571.01, 364/571.02, 571.04, 571.05, 461, 436, 426.044, 423.098, 424.039, 424.06; 340/988, 903, 904, 905, 907, 901; 180/167, 168, 169; 342/454, 455, 456, 458; 307/9.1, 10.1

[56] References Cited

U.S. PATENT DOCUMENTS

| | | | |
|---|---|---|---|
| 3,921,127 | 11/1975 | Narbaits-Jaureguy et al. | 340/901 |
| 5,109,224 | 4/1992 | Lundberg | 340/907 |
| 5,249,027 | 9/1993 | Mathur et al. | 180/167 |
| 5,388,048 | 2/1995 | Yavnayi et al. | 364/461 |
| 5,589,827 | 12/1996 | Sucrati | 340/901 |

FOREIGN PATENT DOCUMENTS

| | | |
|---|---|---|
| 61-6349 | 2/1986 | Japan . |
| 4-262500 | 9/1992 | Japan . |
| 4-289482 | 10/1992 | Japan . |
| 5-6499 | 8/1993 | Japan . |
| 5-205199 | 8/1993 | Japan . |
| 6-9920 | 3/1994 | Japan . |

*Primary Examiner*—Emanuel T. Voeltz
*Assistant Examiner*—Edward J. Pipala
*Attorney, Agent, or Firm*—Antonelli, Terry, Stout & Kraus, LLP.

[57] ABSTRACT

An inter-vehicle distance measuring apparatus is composed of an inter-vehicle data measuring and transmitting unit for measuring and transmitting inter-vehicle distance data related to the distance between a vehicle in front and a host vehicle, a communications unit installed by a road for receiving the inter-vehicle distance data transmitted from the inter-vehicle data measuring and transmitting unit, an inter-vehicle distance measuring unit for measuring the distance between the vehicle in front and the host vehicle, a correction amount determining unit for calculating a correction amount for correcting the distance between the vehicle in front and the host vehicle measured by the measuring unit based on the inter-vehicle distance data received by the communications unit, and a correcting unit for correcting the distance between the vehicle in front and the host vehicle measured by the inter-vehicle distance measuring unit based on the correction amount.

45 Claims, 16 Drawing Sheets

INTER-VEHICLE DISTANCE MEASURING APPARATUS AND METHOD FOR AUTOMOTIVE

BACKGROUND OF THE INVENTION

The present invention relates to an inter-vehicle distance measuring apparatus and method for measuring the distance between a vehicle in front and a host vehicle (which refers to a vehicle equipped with the apparatus of the present invention in the following description).

Conventionally, there have been researched and developed apparatuses for measuring the distance between a host vehicle and a vehicle in front to generate an alarm when the host vehicle is too close to the vehicle in front or systems for controlling a vehicle to run with a proper distance maintained between the vehicle and a vehicle in front or so as to avoid a collision therebetween. Means conventionally developed for measuring the distance between vehicles for the vehicle control systems as mentioned above include optical radars, radio wave radars, and inter-vehicle distance measuring apparatuses utilizing an image. For example, JP-B-61-6349 discloses an optical radar, JP-A-4-289482 discloses a radio wave radar, and JP-A-4-262500 discloses an apparatus for following a vehicle in front utilizing an image.

In addition, since the inter-vehicle distance measuring apparatuses as mentioned above are closely related to safety running of a host vehicle, methods have been proposed for detecting or preventing malfunctions and fault of these apparatuses. For example, JP-A-5-64999 (UM) describes a method of detecting a broken front glass of a laser radar, while JP-Y2-6-9920 (UM) describes a method of blowing air on a front glass of a laser radar to remove stains away therefrom.

However, conventional inter-vehicle distance measuring apparatuses have a problem that they fail to detect a vehicle in front or they output a measured distance between a vehicle in front and a host vehicle with a larger error if they experience serious troubles such as disconnection of lines in internal circuits, malfunctions of parts, a sudden change of the mounting of the apparatus itself, and so on.

SUMMARY OF THE INVENTION

It is an object of the present invention to provide an inter-vehicle distance measuring apparatus and method for correcting an error in a measured value outputted from an inter-vehicle distance measuring unit equipped in a host vehicle.

It is another object of the present invention to provide an inter-vehicle distance measuring apparatus and method for detecting an erroneous measured value outputted from an inter-vehicle distance measuring unit equipped in a host vehicle.

According to one aspect of the present invention, an inter-vehicle distance measuring apparatus equipped in a host vehicle receives inter-vehicle distance data measured by an external inter-vehicle distance measuring apparatus installed by a road through a road-to-vehicle communications unit, and corrects an error in the distance value measured by an inter-vehicle distance measuring unit equipped in the host vehicle as well as detects a trouble in the inter-vehicle distance measuring unit based on the received data.

According to another aspect of the present invention, an inter-vehicle distance measuring apparatus equipped in a host vehicle receives a differential signal indicative of a time difference, measured by a sensor placed by a road for detecting passage of vehicles, between the time a vehicle in front passes the sensor and the time the host vehicle passes the same through a road-to-vehicle communications unit, calculates the distance between the vehicle in front and the host vehicle based on the received differential signal, and corrects an error in the distance value measured by an inter-vehicle distance measuring unit equipped in the host vehicle as well as detects a trouble in the inter-vehicle distance measuring unit based on the calculated distance between the vehicles.

According to a further aspect of the present invention, an inter-vehicle distance measuring apparatus equipped in a host vehicle detects that the host vehicle has passed a fixed marker placed on a road, measures the distance to a target placed at a known distance from the fixed marker, and corrects an error in the distance value measured by an inter-vehicle distance measuring unit equipped in the host vehicle as well as detects a trouble in the inter-vehicle distance measuring unit.

According to a yet further aspect of the present invention, an inclination of an inter-vehicle distance measuring unit equipped in a host vehicle is detected to determine any trouble caused by the inclined inter-vehicle distance measuring unit.

DESCRIPTION OF THE PREFERRED EMBODIMENTS

Figure 1:
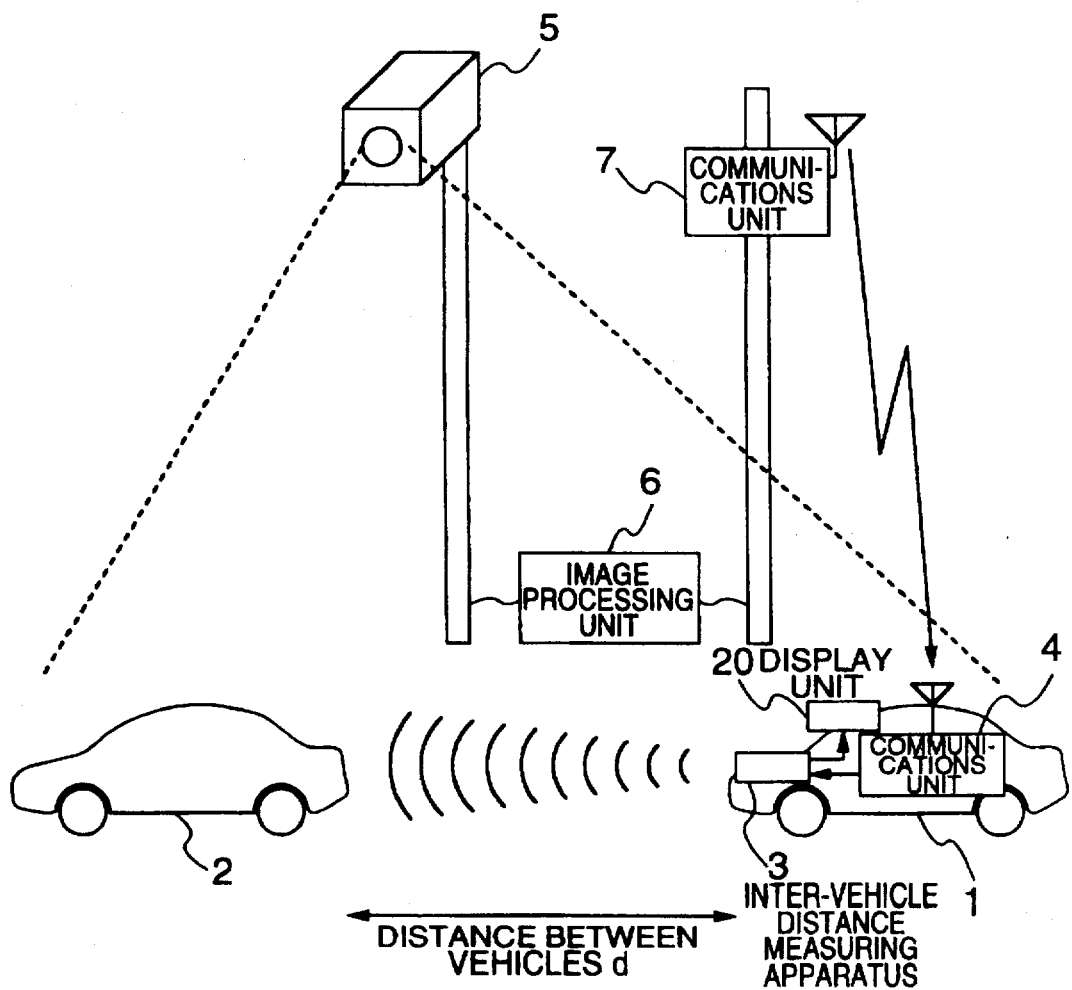
FIG. 1 is a diagram generally illustrating the configuration of an inter-vehicle distance measuring apparatus according to the present invention.

FIG. 1 generally illustrates the configuration of an embodiment of an inter-vehicle distance measuring apparatus according to the present invention. Specifically, the distance between a vehicle 2 in front and a host vehicle 1 is measured by an inter-vehicle distance measuring system installed by a road. The inter-vehicle distance measuring system is implemented by a TV camera 5 and an image processing unit 6 installed by the road. The TV camera 5 simultaneously images both the vehicle 2 in front and the host vehicle 1, and when the front end of the host vehicle 1 reaches a predetermined position in an image produced by the TV camera 5, the image processing unit 6 captures image data at that time, such that a distance d between the vehicle in front 2 and the host vehicle 1 is determined depending on the position of the back end of the vehicle 2 in front in the captured image data. If the vehicle 2 in front does not exist in the image when the host vehicle 1 reaches the predetermined position in the image, it is determined that there is no vehicle in front. The inter-vehicle distance data thus captured is transmitted to a communications unit 4 equipped in the host vehicle 1 through a road-to-vehicle communications unit 7. The road-to-vehicle communications unit 7 may be implemented by a communications unit utilizing a radio wave or optical beacon unit or a leakage coaxial cable and so on. A possible error in a measured distance between the vehicle 2 in front and the host vehicle 1 provided by an inter-vehicle distance measuring apparatus 3 equipped in the host vehicle 1 is corrected based on information on the distance between the vehicle 2 in front and the host vehicle 1 sent to the inter-vehicle distance measuring apparatus 3 equipped in the host vehicle 1 through the road-to-vehicle communications unit 7 and the communications unit 4 equipped in the host vehicle 1. If an extremely large error is detected, or if the existence of the vehicle 2 in front detected by the inter-vehicle distance measuring system installed by the road cannot be detected by the inter-vehicle distance measuring apparatus 3 equipped in the host vehicle 1, and vice versa, it is determined that the inter-vehicle distance measuring apparatus 3 equipped in the host vehicle 1 is suffering from any trouble, and this is informed to a driver or a remote operator of the host vehicle 1 on a display unit 20 or with sound, light, and so on through the communications unit 4.

Figure 2:
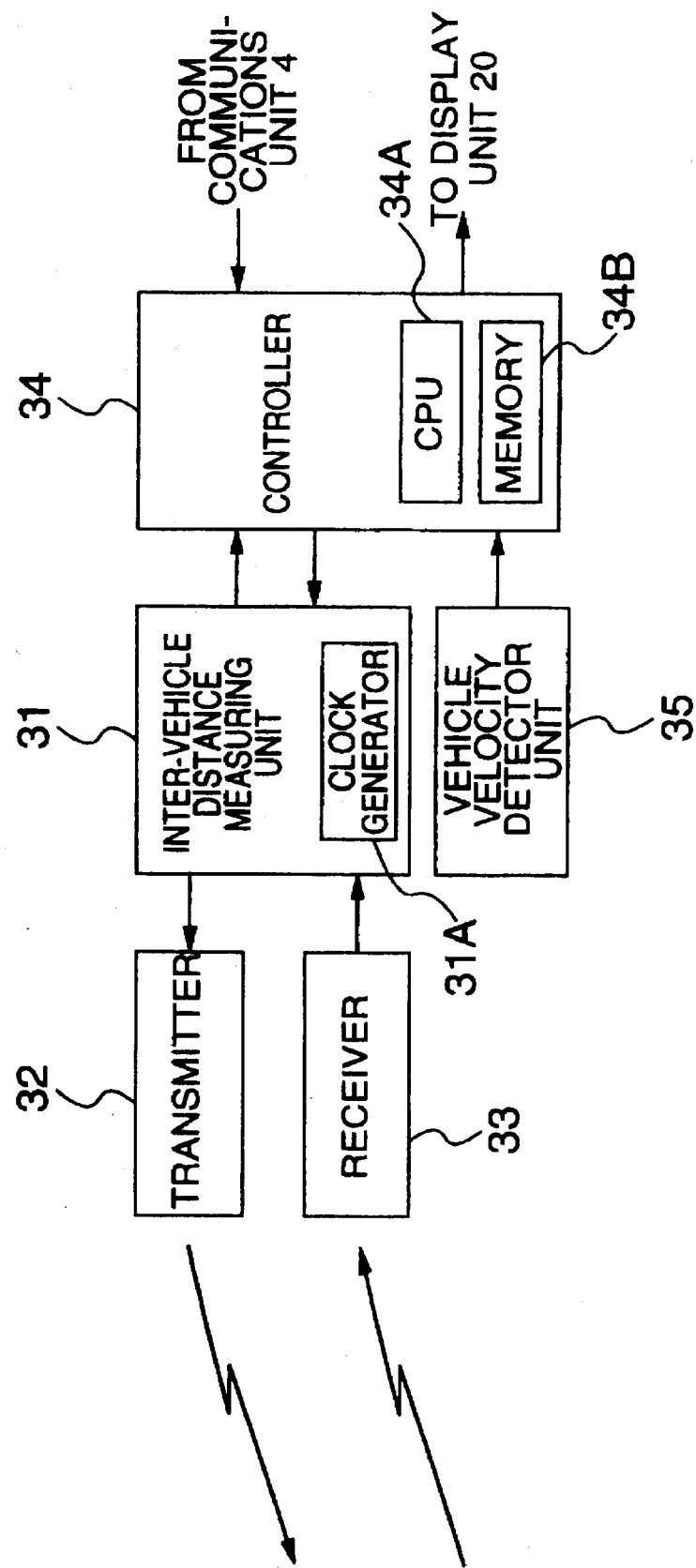
FIG. 2 is a block diagram illustrating the inter-vehicle distance measuring apparatus equipped in a vehicle in FIG. 1.

FIG. 2 is a block diagram illustrating in detail the configuration of the inter-vehicle distance measuring apparatus 3. Referring specifically to FIG. 2, in an inter-vehicle distance measuring unit 31 equipped in the host vehicle 1, laser beam or radio waves are transmitted from a transmitter 32 and reflected back from a vehicle 2 in front. The reflected laser beam or radio waves are received by receiver 33. Based on a different between a transmission signal and a reception signal, clock signals generated by a clock generator 31A are count to calculate the distance between the vehicle in front 2 and the host vehicle 1. The calculated distance between the vehicles is transferred to a controller 3

The controller 34, including a CPU 34A and memory 34B, samples the velocity of the host vehicle detected by a velocity detector unit 35 and sequentially stores a predetermined number of samples in the memory 34B. The CPU 34A generates a signal for correcting an inter-vehicle distance signal from the inter-vehicle distance measuring unit 31 based on inter-vehicle distance data received by the communications unit 4, and stores the correction signal in the memory 34B. When the CPU 34A detects any error in a measured value of the distance between the two vehicles, the CPU 34A displays the error on the display unit 20 in order to inform the driver to that effect.

A flow of the operations performed by the CPU 34A in the inter-vehicle distance measuring apparatus as described above is illustrated in FIG. 3. Specifically, at step 100, information on whether or not a vehicle in front is present and reference data on the distance between the vehicle in front and a host vehicle are inputted from the inter-vehicle distance measuring system, composed of the TV camera 5, the image processing unit 6 and the communications unit 7, installed by the road. At step 101, the CPU 34A captures information on the presence or absence of a vehicle in front detected by using the inter-vehicle distance measuring unit 31, and, if a vehicle in front is present, data on the distance between the vehicle in front and the host vehicle is measured by the measuring unit 31. The data detected or measured by the inter-vehicle distance measuring unit 31 equipped in the host vehicle 1 are called the "measured data" for distinguishing them from the reference data received from the outside of the host vehicle. Next, at steps 102, 103, 109, it is checked whether there is a difference in the determination of the presence or absence of a vehicle in front between the reference data and the measured data. If the measured data indicates that the existence of a vehicle in front has been detected while the reference data indicates a determination that no vehicle in front is present, an erroneous detection due to any trouble in the inter-vehicle distance measuring unit 31 is determined at step 110. Similarly, if the measured data indicates that no vehicle in front is detected while the reference data indicates the existence of a vehicle in front, detection failure due to any trouble in the inter-vehicle distance measuring unit 31 is determined at step 111. When both the reference data and the measured data indicate the detection of a vehicle in front, a difference in the inter-vehicle distance data therebetween is calculated as an inter-vehicle distance measurement error. At steps 105, 106, the magnitude of the measurement error is determined. If the measurement error is extremely large, it is determined at step 112 that the measured value is erroneous. If the measurement error is equal to or larger than a predetermined threshold, a correction value for the measurement error is stored in the memory 34B at step 108. The measured vehicle distance is corrected with the correction value calculated at step 108, and the corrected vehicle distance is displayed on the display unit 20 for the driver. If it is determined at step 110, 111 or 112 that the inter-vehicle distance measuring apparatus has a trouble, the trouble in the inter-vehicle distance measuring apparatus is informed to the driver at step 113 through the display unit 20. For reference, the error correcting method at step 118 may be implemented by a technique unitizing a Kalman filter to correct an offset amount and a bias amount, and so on. Subsequently, a measured vehicle distance outputted from the inter-vehicle distance measuring unit 31 is corrected by the correction value stored in the memory 34B, and a corrected distance is displayed on the display unit 20.

Figure 4:
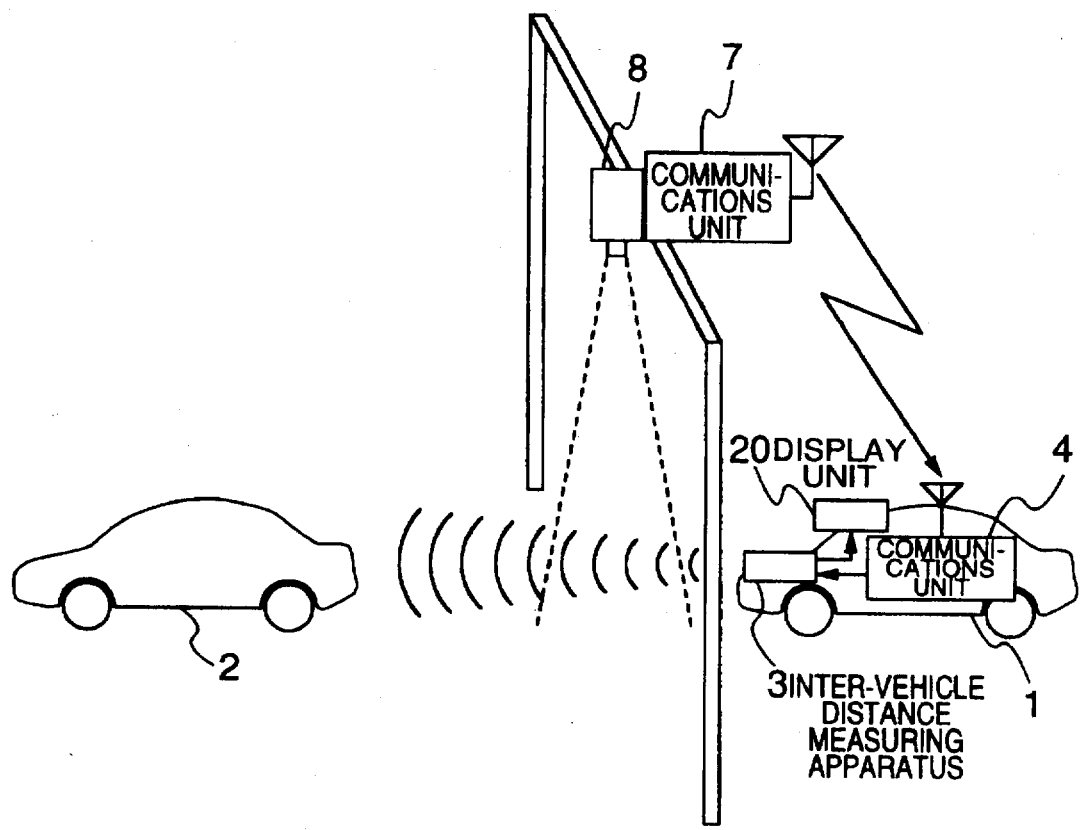
FIG. 4 is a diagram illustrating another embodiment of an inter-vehicle distance measuring apparatus.
Figure 5:
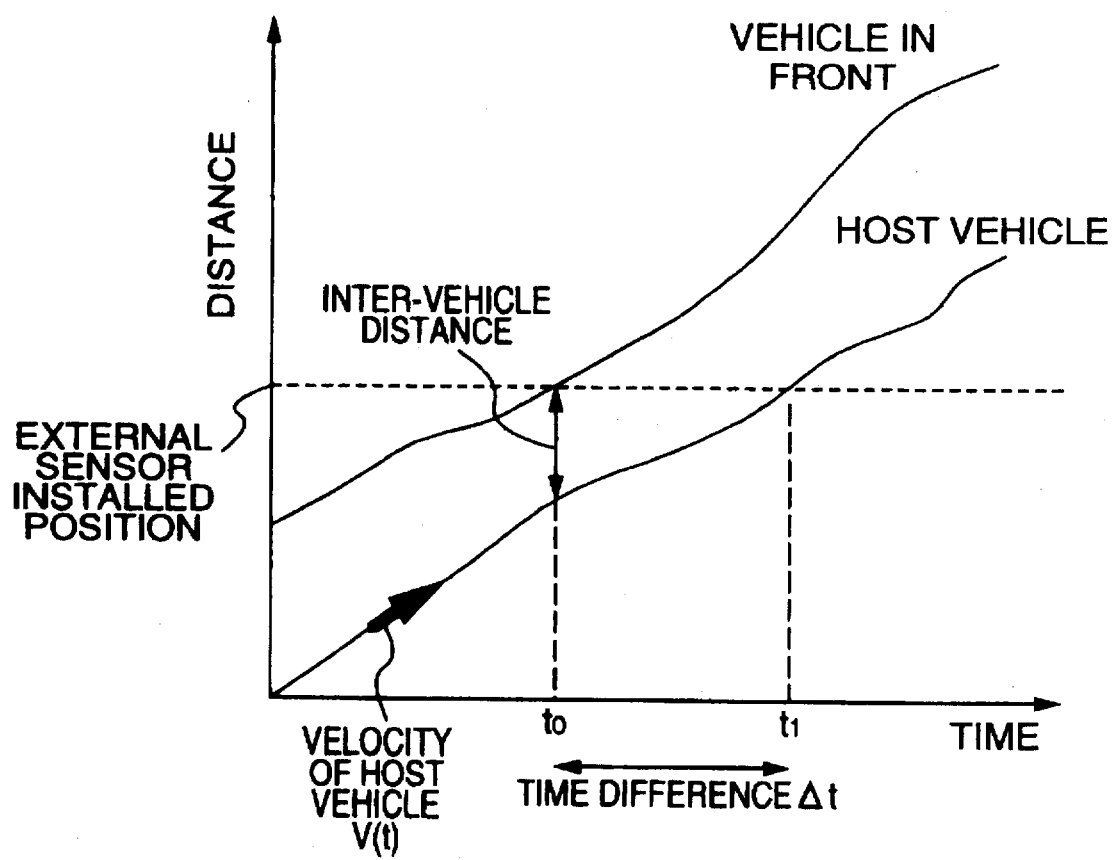
FIG. 5 is a graph showing temporal changes in the distance between a host vehicle and a vehicle in front.

Next, a second embodiment will be described with reference to FIGS. 4, 5. A sensor 8 for detecting passage of vehicles is installed by a road to measure a time difference t between time t0 at which the back end of a vehicle in front has passed below the sensor 8 and time t1 at which the front end of a host vehicle has passed below the sensor 8. Information on the measured passage time difference t between the vehicle and front and the host vehicle is transmitted to an inter-vehicle distance measuring apparatus 3 equipped in the host vehicle through the road-to-vehicle communications unit 7 and a communications unit 4 equipped in the host vehicle, similarly to the embodiment illustrated in FIG. 1. In the inter-vehicle distance measuring apparatus 3 equipped in the host vehicle, a velocity detector unit 35 continuously stores instantaneous velocity values v(t) of the host vehicle in a memory 34B. A CPU 34A calculates a distance D travelled by the host vehicle from time t0 at which the vehicle in front passed below the sensor 8 to time t1 at which the host vehicle passed below the sensor 8 by integrating the velocity v(t) of the host vehicle from time t0 to time t1, as given by Equation 1, where t1 is the time the CPU 34A receives the time difference data t and t0 is the time t before time t1. The distance D is designated as a distance d(t0) between the vehicle in front and the host vehicle at time t0. The CPU 34A relies on the vehicle distance D calculated as described above to correct an error in the distance value measured by the inter-vehicle distance measuring unit 31 equipped in the host vehicle and to perform a fault diagnosis on the inter-vehicle distance measuring unit 31, similarly to the embodiment illustrated in FIG. 1, and informs the driver of a corrected distance between the vehicle in front and the host vehicle and a detected trouble of the inter-vehicle distance measuring unit 31 on a display unit 20. While the example expressed by Equation 1 calculates the running distance D of the host vehicle using the velocity v(t), the running distance D of the host vehicle may also be revealed by using a distance sensor equipped in the host vehicle.

$$D = \int_{t0}^{t1} V(t)dt \, v(t): \quad (1)$$
velocity of the host vehicle
$D = d(t0) \, d(t0):$
distance between vehicles at time t0

Figure 3:
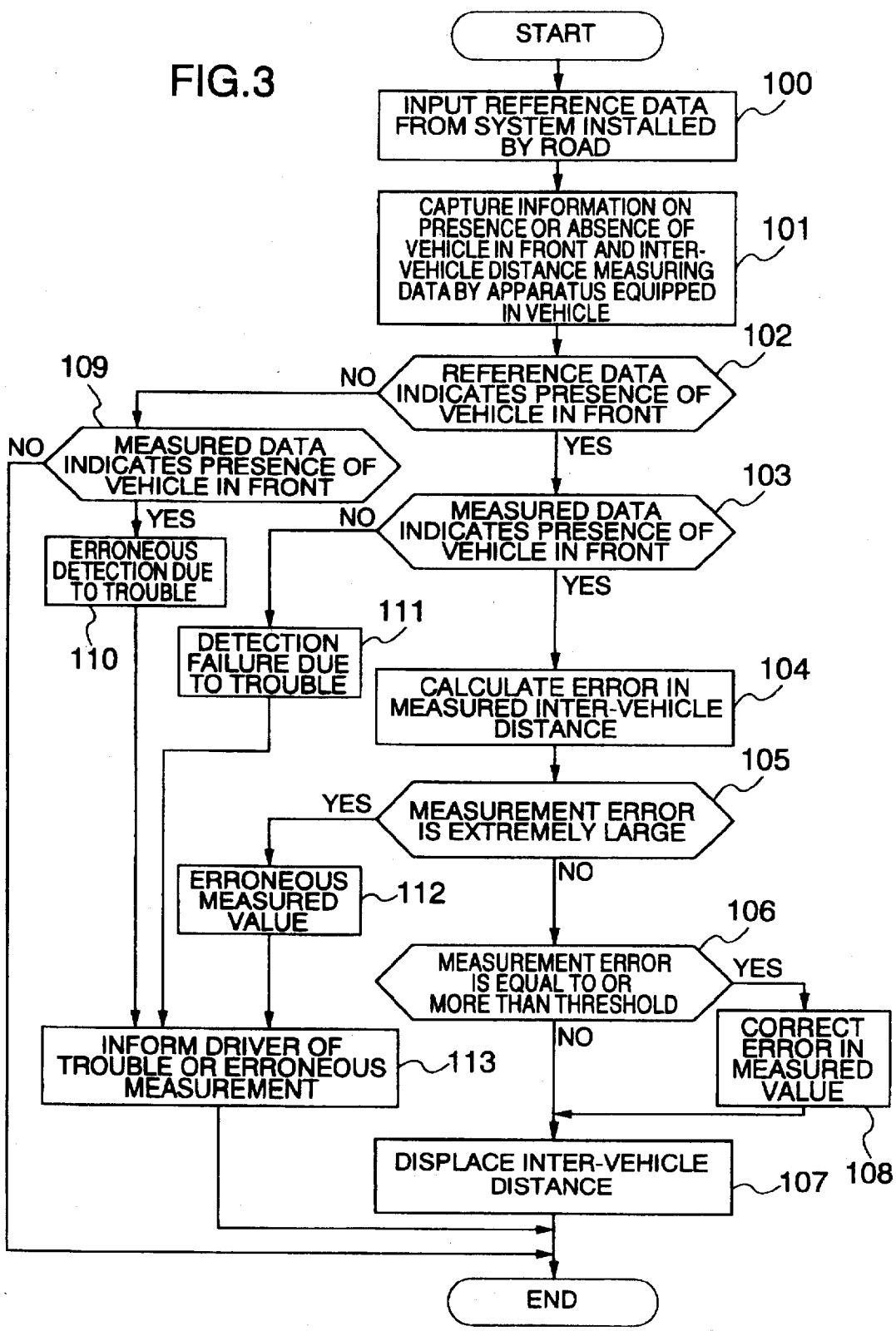
FIG. 3 is a flow chart illustrating an embodiment of a processing flow in accordance with an inter-vehicle distance measuring method of the present invention.

It should be noted that the second embodiment may also employ the processing flow illustrated in FIG. 3 to determine whether the inter-vehicle distance measuring apparatus equipped in the host vehicle has a trouble as well as to correct an error in a measured distance value.

Figure 6:
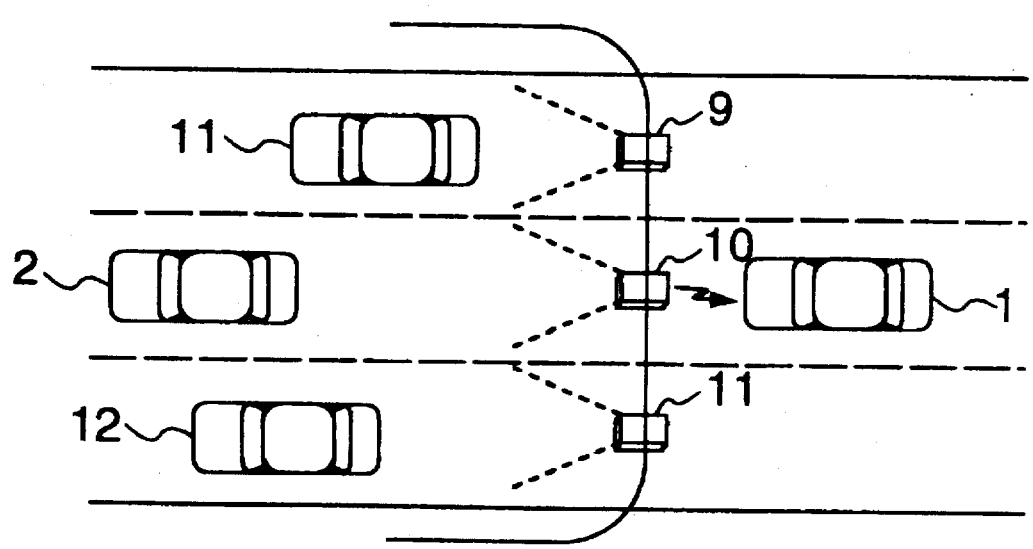
FIG. 6 is a diagram illustrating an embodiment of an inter-vehicle distance measuring apparatus for use with a road having a plurality of lanes.

Next, a third embodiment will be described with reference to FIG. 6. A sensor for detecting passage of vehicles, similar to the embodiment illustrated in FIG. 4, is installed above each of a plurality of lanes of a road. FIG. 6 illustrates an example in which a communication unit 9, 10 or 11 incorporating sensor for detecting passage of vehicles on each of three lanes are installed above the road. Each of these units detects the time each vehicle passes therebelow, and informs a host vehicle 1 of the time a vehicle 2 in front has passed on an associated lane. Each communication unit is preferably an optical beacon unit which can communicate by a light beam with only a vehicle passing on the associated lane and therefore each optical beacon unit can transmit time information of an vehicle passed on the associated lane, detected by the associated sensor, to a vehicle passing directly under the associated optical beacon unit. The host vehicle 1 internally calculates the distance to each vehicle by the method described in connection with the second embodiment, and determines whether an inter-vehicle distance measuring apparatus equipped therein has a trouble as well as corrects an error, if detected, in the distance value measured by the inter-vehicle distance measuring apparatus, using a similar processing flow to that illustrated in FIG. 3.

Figure 7:
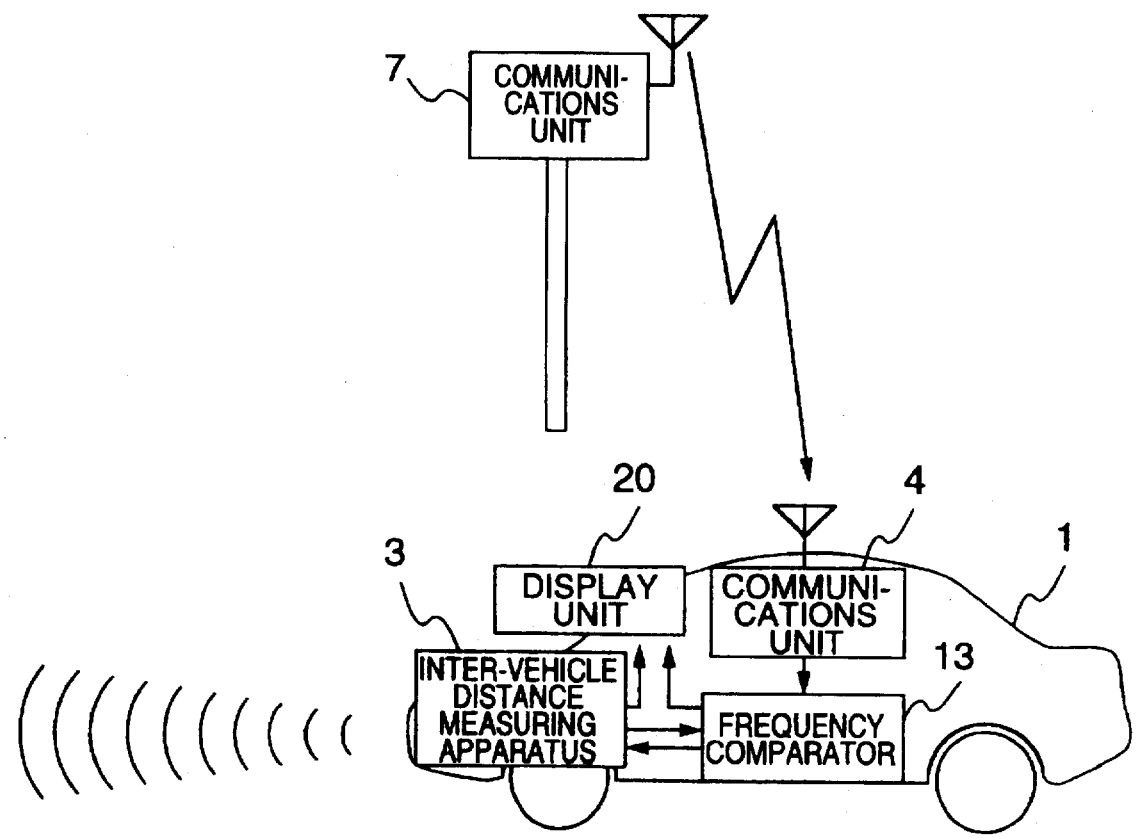
FIG. 7 is a diagram illustrating an embodiment of an inter-vehicle distance measuring apparatus utilizing a communication frequency between a road and a vehicle as a reference.

Next, a fourth embodiment will be described with reference to FIG. 7. Radio waves or an optical signal transmitted from a communications unit 7 installed by a road is received by a communications unit 4 equipped in a host vehicle 1 to measure a carrier frequency or a data transmission frequency of the received signal. Since the measured frequency is a highly accurate fixed frequency, a frequency of a clock signal generated by a clock generator 31A in an inter-vehicle distance measuring unit 31 equipped in the host vehicle 1 is compared with this measured frequency as a reference in a frequency comparator 13 to detect errors in the clock signal and any trouble in the inter-vehicle distance measuring apparatus 3. The result of the comparison is used to determine a trouble in the inter-vehicle distance measuring apparatus 3 as well as to correct an error in a measured distance value between the host vehicle 1 and a vehicle 2 in front due to errors between the clock signal and the reference frequency. If the inter-vehicle distance measuring apparatus 3 has any trouble or if a detected measurement error is equal to or larger than a certain level, the driver is informed to that effect through a display unit 20. Alternatively, radio waves at 1.57542 GHz from GPS satellites may be received in order to correct measurement errors and detect a trouble in the inter-vehicle distance measuring apparatus 3.

Next, a fifth embodiment will be described with reference to FIGS. 8, 9, 10. A marker 14 and a target 15 are placed along a road with a known distance R therebetween. In an example illustrated in FIG. 8, the marker 14 is embedded in the road, while the target is placed by a corner of the road. A marker detector unit 17 detects passage of a host vehicle 1 above the marker 14 and transmits this to an inter-vehicle distance measuring apparatus 3 equipped in the host vehicle 1. In response, the inter-vehicle distance measuring apparatus 3 measures the distance to the target 15, and determines by itself whether or not the measured distance to the target 15 is correct, since the distance between the marker 14 and the target 15 is known, to correct any error detected in the measured distance. Simultaneously, it is also determined whether or not the inter-vehicle distance measuring apparatus 3 has any trouble by checking whether the measuring apparatus 3 was able to detect the target 14. The result of the determination is displayed on the display unit 20 to inform the driver that the inter-vehicle distance measuring apparatus 3 is correctly operating if the determination result indicates that it was able to detect the target 15 or that the inter-vehicle distance measuring apparatus 3 has a trouble if the determination result indicates that it was not able to detect the target 15. The marker 14 embedded in the road may be implemented, for example, by a magnet, a loop antenna, or the like. The target 15 may be implemented by a reflector for reflecting radio waves, a reflector for reflecting light, a plate painted in a bright color easily recognizable by a camera, or any other member having a combination of two or more of these features.

Figure 9:
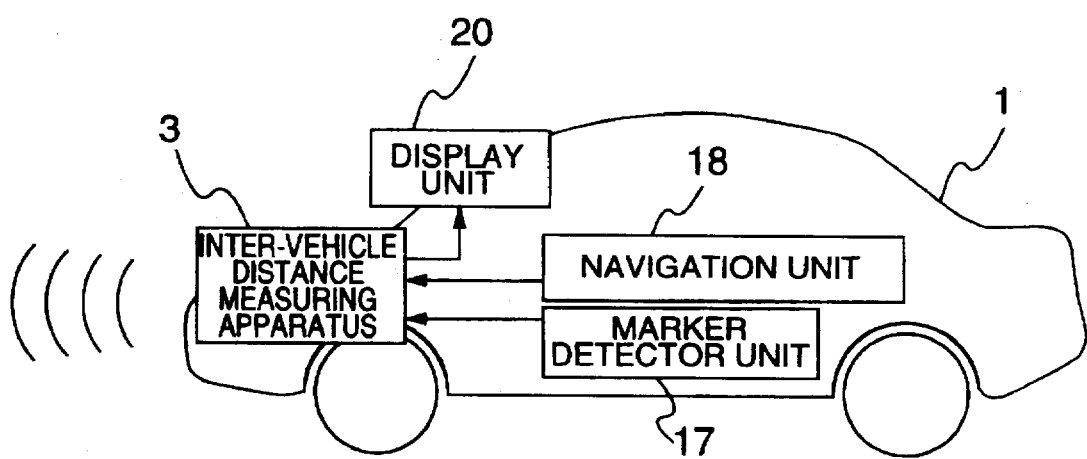
FIG. 9 is a block diagram illustrating an exemplary configuration of various apparatuses equipped in a vehicle for use with the embodiment of Fig, 8.

Referring now to FIG. 9, the position at which the marker 15 is placed and the distance between the marker 14 and the target 15 may be previously stored in map information included in a navigation unit 18. Since the position of the host vehicle 1 can be known momently by the navigation unit 18, the navigation unit 18 may previously inform the inter-vehicle distance measuring apparatus 3 that the host vehicle 1 is running on the road in which the marker 14 is embedded. In this way, the inter-vehicle distance measuring apparatus 3 is provided with a function of switching itself to a mode in which a measured distance between the host vehicle 1 and a vehicle 2 in front is corrected immediately before the host vehicle 1.passes above the marker.

Figure 10:
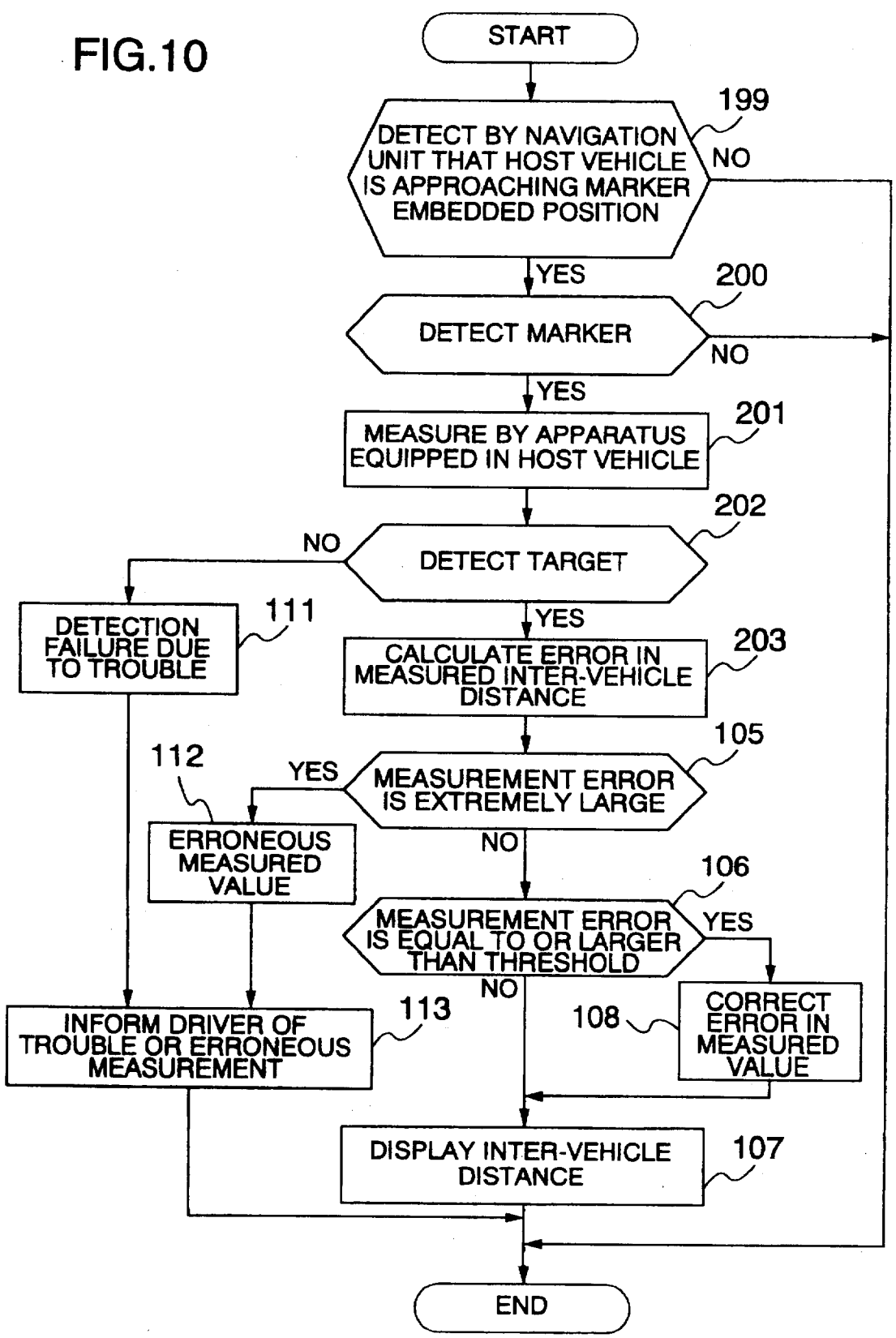
FIG. 10 is a flow chart illustrating a processing flow executed in the embodiment of FIG. 8.

In this case, a flow of operations performed by a CPU 34A in the inter-vehicle distance measuring apparatus 3 is as illustrated in FIG. 10.

Referring specifically to FIG. 10, the flow starts at predetermined intervals, and it is determined at step 199 whether or not the navigation unit 18 detects that the host vehicle 1 is approaching the marker embedded position. If NO is determined at step 199, the flow is terminated. Conversely, if YES is determined, it is determined at step 200 whether or not the marker detector unit 17 has detected the marker 14. If NO is determined at step 200, the flow is terminated. Conversely, if YES is determined, the inter-vehicle distance measuring unit 31 equipped in the host vehicle 1 detects the target 15 and measures the distance to the target 15. If the target 15 cannot be detected at step 202, it is determined at step 111 that the inter-vehicle distance measuring apparatus 3 has a trouble so that it cannot detect the target 15. If the target 15 can be detected at step 202, a measured distance between the marker 14 and the target 15 is captured at step 203 to calculate an error between the measured distance and the previously known distance between the marker 14 and the target 15. Next, similarly to the flow illustrated in FIG. 3, the magnitude of the measurement error is determined at steps 105, 106. If the measurement error is extremely large, it is determined at step 112 that the measured value is not correct. If the measurement error is equal to or larger than a predetermined threshold, a correction value for the measurement error is stored in the memory 34A at step 108. At step 107, the measured distance between the host vehicle 1 and a vehicle 2 in front is corrected with the correction value, and the corrected distance is displayed for the driver. If it is determined at step 111 or 112 that the inter-vehicle distance measuring apparatus 3 has a trouble, the driver is informed of the trouble of the inter-vehicle distance measuring apparatus at step 113.

Figure 8:
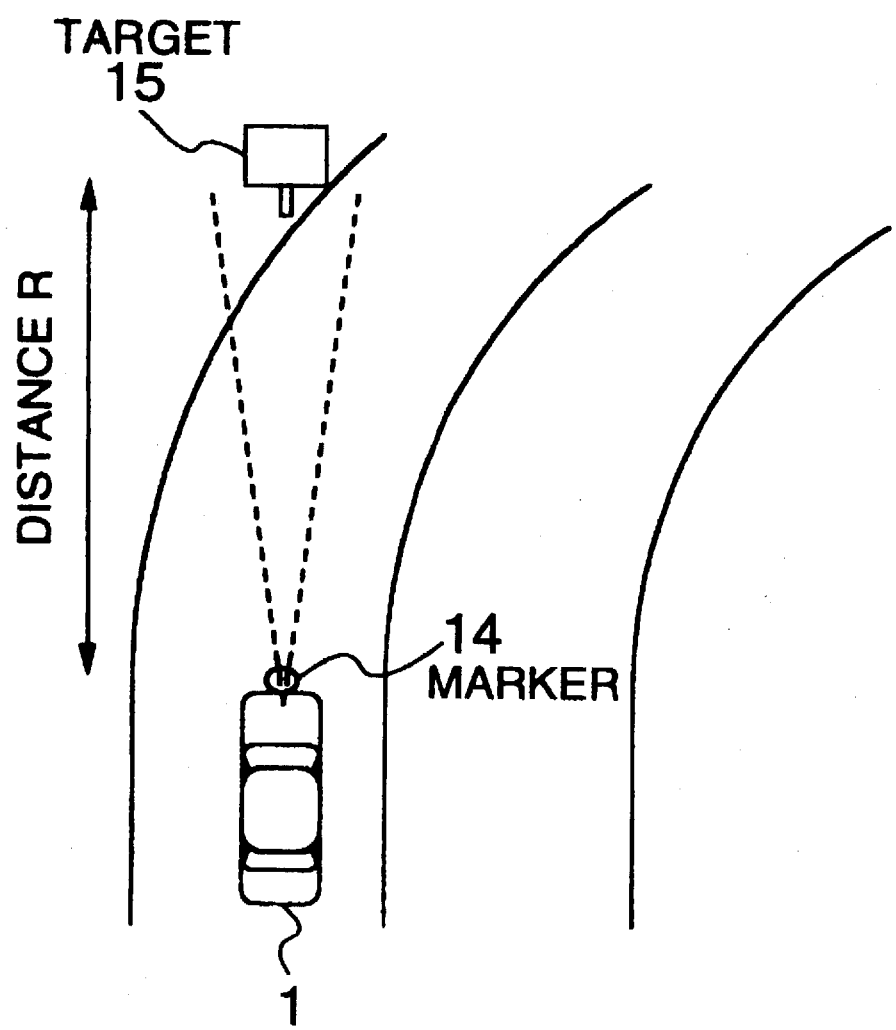
FIG. 8 is a diagram illustrating an embodiment of an inter-vehicle distance measuring apparatus utilizing a marker placed on a road and a target by the road.
Figure 11:
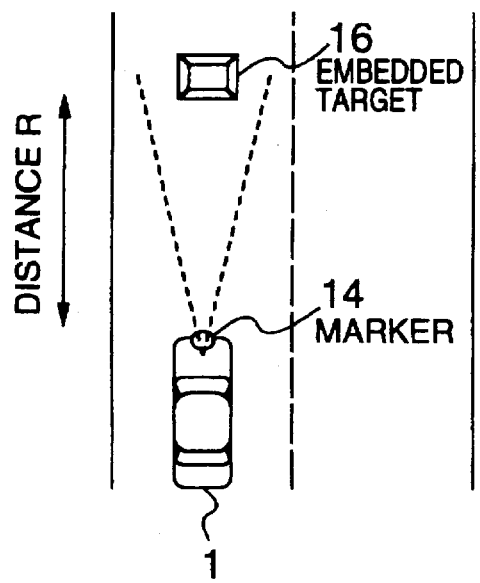
FIG. 11 is a diagram illustrating another embodiment of an inter-vehicle distance measuring apparatus utilizing a marker placed on a road and a target embedded in the road.

A next example illustrated in FIG. 11 is similar to FIG. 8, except that a target 16 is embedded in a road.

Figure 12:
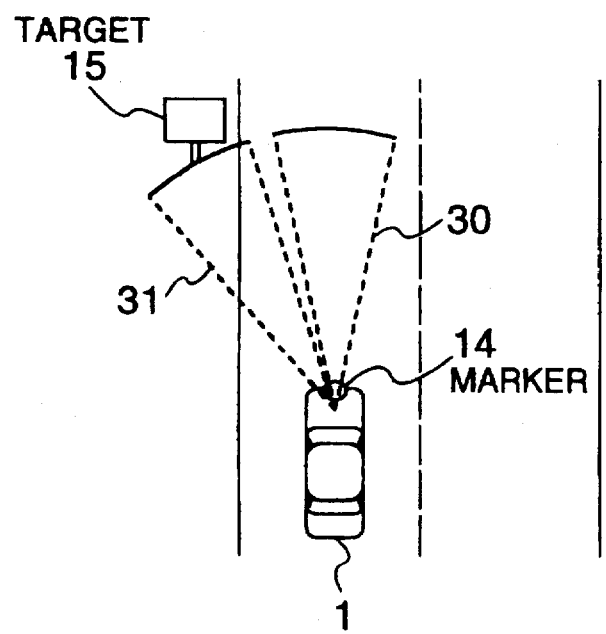
FIG. 12 is a diagram illustrating another embodiment of an inter-vehicle distance measuring apparatus utilizing a marker placed on a road and a target by the road.

Further, an example illustrated in FIG. 12 shows that a host vehicle is equipped with an inter-vehicle distance measuring apparatus capable of changing its directivity, wherein the direction in which the distance between the host vehicle 1 and a vehicle 2 in front is measured is temporarily changed to a direction 31 from a regular inter-vehicle distance measuring direction 30, when the inter-vehicle distance measuring apparatus detects a marker 14. An inter-vehicle distance measuring apparatus having a function of horizontally scanning its measuring direction is known. When this known inter-vehicle distance measuring apparatus is used, the distance between the host vehicle 1 and a vehicle 2 in front, measured at the time the inter-vehicle distance measuring apparatus is directed to the direction 31 for the first time after it detected the marker 14, is captured as a measured distance between the target 15 and the marker 4. For reference, known examples of inter-vehicle distance measuring apparatuses capable of scanning the directivity are described, for example, in JP-B-61-6349 and JP-A-5-205199.

Figure 13:
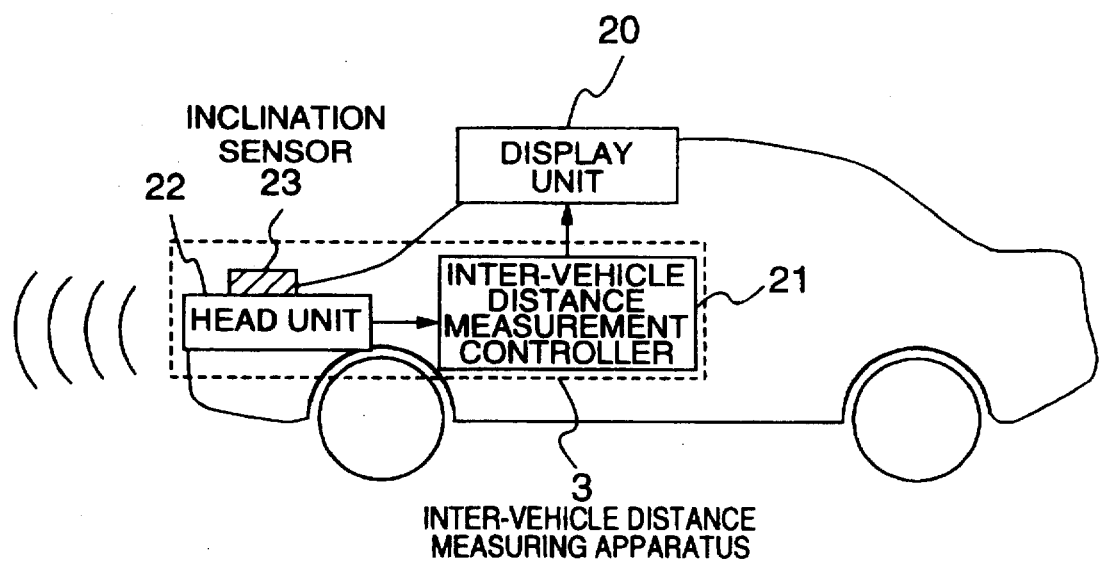
FIG. 13 is a diagram illustrating an embodiment of an inter-vehicle distance measuring vehicles apparatus having an inclination sensor mounted on a head unit of the inter-vehicle distance measuring apparatus.
Figure 14:
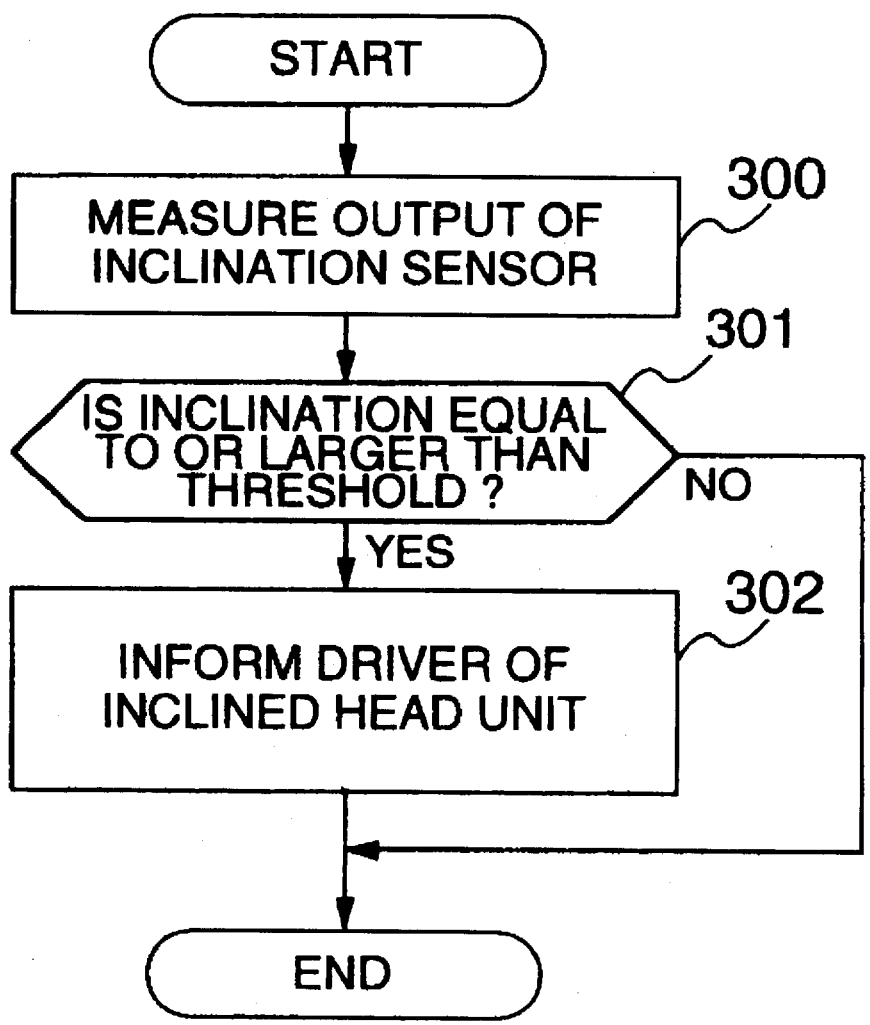
FIG. 14 is a flow chart illustrating a processing flow executed in the embodiment of FIG. 13.

Next, a sixth embodiment will be described with reference to FIGS. 13, 14. If a head unit 22 serving to transmit and receive signals from and to an inter-vehicle distance measuring apparatus 3 is inclined, the inter-vehicle distance measuring apparatus 3 may fail to detect a vehicle in front. To solve this problem, the head unit 22 is provided with an inclination sensor 23 for detecting such inclined head unit 22. If the output of the inclination sensor 23 is equal to or more than a predetermined threshold, the driver is informed on a display unit 20 that the head unit 22 is inclined by the threshold or more. FIG. 14 illustrates a flow of operations performed by a CPU 34A for this case. Specifically explaining, the output of the inclination sensor 23 is measured at step 300, and it is determined at step 301 whether the output indicates an inclination equal to or more than a predetermined threshold. If the inclination of the head is equal to or more than the predetermined threshold, the driver is informed that the head unit 22 is inclined at step 302.

Figure 15:
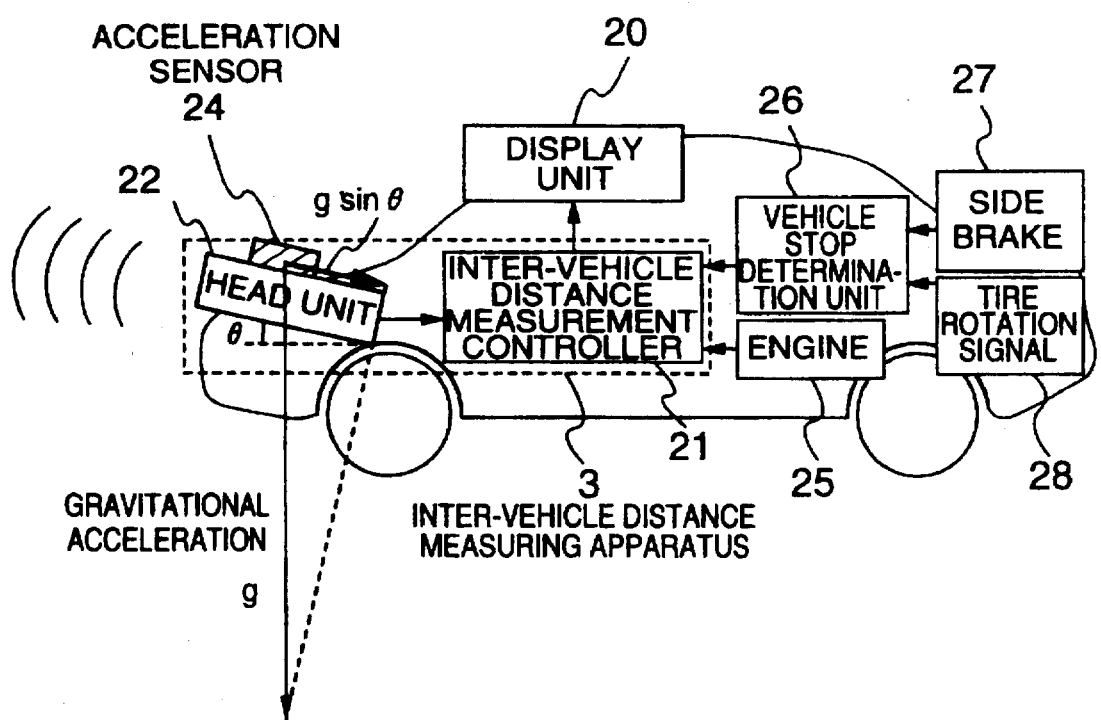
FIG. 15 is a diagram illustrating an embodiment of an inter-vehicle distance measuring apparatus employing an accelerometer for detecting an inclination.
Figure 16:
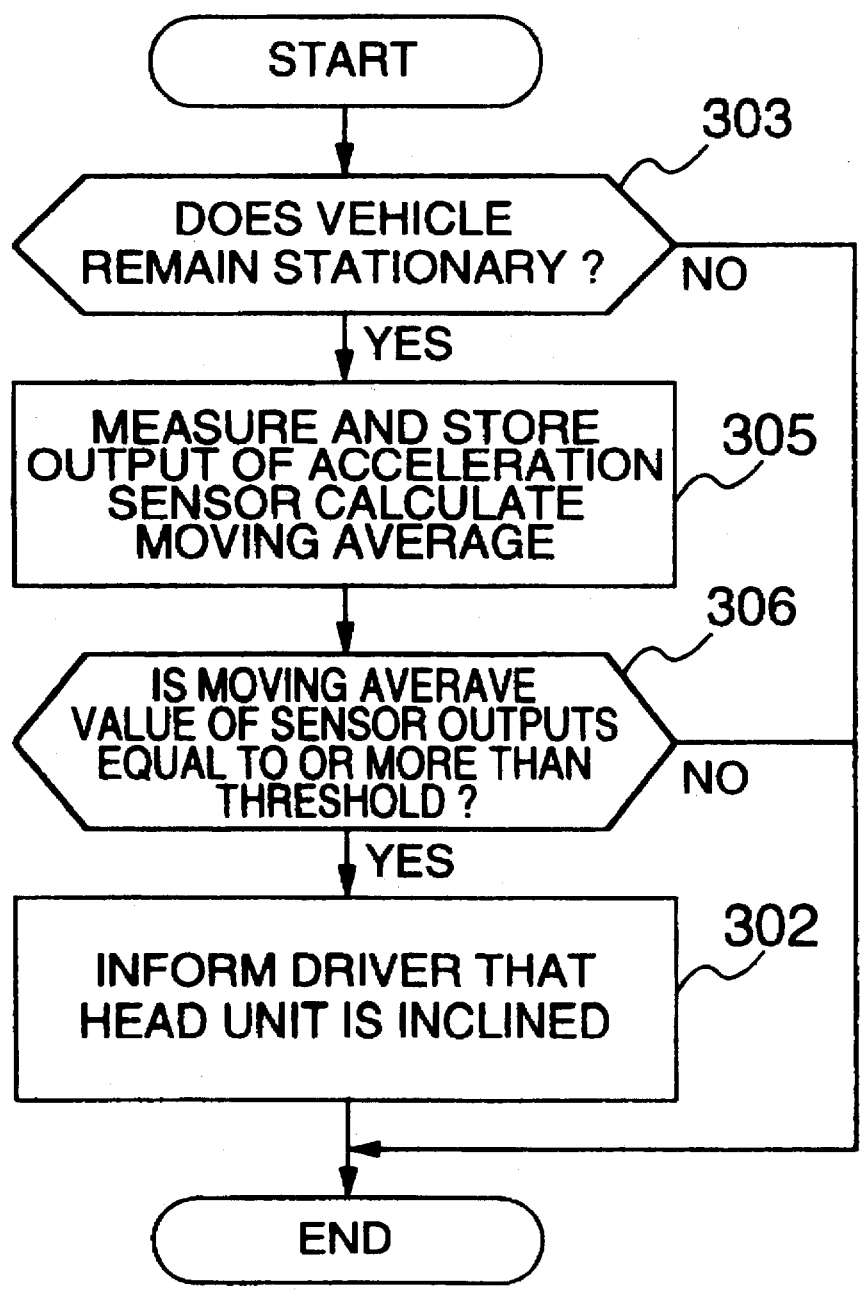
FIG. 16 is a flow chart illustrating a processing flow executed in the embodiment of FIG. 15.

An embodiment illustrated in FIGS. 15, 16 shows an example in which an accelerometer is used as the inclination sensor in the sixth embodiment. An accelerometer 24 is mounted on the head unit 22 of the inter-vehicle distance measuring apparatus for detecting an acceleration in the horizontal direction of a vehicle. If the head unit 22 is inclined by an angle as illustrated in FIG. 15, the accelerometer 24 generates an output given by gsin, where g is the gravitational acceleration. Since the accelerometer 24 is applied with an acceleration due to behaviors of the vehicle in addition to the gravitational acceleration, it is necessary to remove the influence of the acceleration due to behaviors of the vehicle. For this purpose, a vehicle stop determination unit 26 detects, based on a side brake 27 and a tire rotation signal 28, when the vehicle is in a stationary state. If the output of the accelerometer is detected only during the stationary state of the vehicle, the gravitational acceleration only can be detected without the influence of changes in acceleration due to behaviors of the vehicle. It should be noted that if the vehicle remains stationary on a sloping road, the accelerometer 24 also detects the slope of the road, thereby failing to correctly detect the inclination of the head unit 22 itself. Thus, the output of the accelerometer 24 is detected and stored in a memory 34B every time the vehicle stops, such that an inclination of the head unit 22 is determined from an average output which may be derived, for example, by calculating a moving average of past 300 outputs of the accelerometer 24. If the determined inclination of the head unit 22 is equal to or more than a predetermined threshold value, an alarm is outputted to the display unit 20 to inform the driver of the inclined head unit 22.

The foregoing determination flow is illustrated in FIG. 16. Specifically, at step 303, the vehicle stop determination unit 26 determines whether the vehicle remains stationary based on the side break 27 and the tire rotation signal 28. If the vehicle stop determination unit 26 determines that the vehicle remains stationary, the output of the accelerometer is measured and stored in the memory 34B for calculating a moving average of past 300 outputs at step 305. It is determined at step 306 whether the moving average of the outputs of the accelerometer is equal to or more than a threshold. If the moving average is determined to be equal to or more than the threshold, the driver is informed at step 302 that the head unit of the inter-vehicle distance measuring apparatus is inclined.

A concept of the entire operation of the first-fifth embodiments described above will be described with reference to FIGS. 17, 18.

Figure 17:
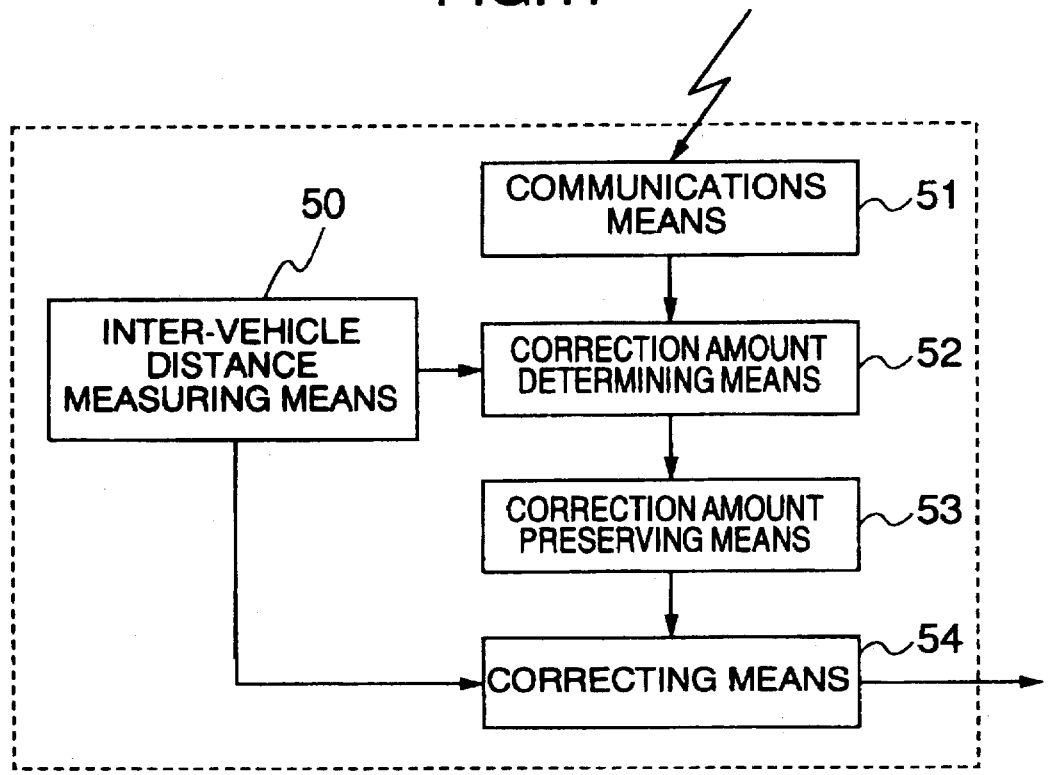
FIG. 17 is a functional block diagram illustrating an inter-vehicle distance measuring apparatus having a function of correcting a measured value of the distance between vehicles.

FIG. 17 illustrates a functional block diagram of an inter-vehicle distance measuring apparatus having a function of correcting a measured distance based on information external to a vehicle. A communications means 51 for communicating data with the outside through a communication medium such as radio waves, light, and so on receives inter-vehicle distance information from the outside. Inter-vehicle distance information measured by an inter-vehicle distance measuring means 50 is compared with the inter-vehicle distance information received by the communications means 50 by a correction amount determining means 52 to calculate a correction value for the inter-vehicle distance value measured by the inter-vehicle distance measuring means 50. A correcting means 54 corrects the vehicle distance value measured by the inter-vehicle distance measuring means 50 based on the calculated correction value and outputs a corrected value of the measured inter-vehicle distance.

Also, in this event, since the frequency of the incoming vehicle distance information through the communications means 51 from the outside of the vehicle is not so high as the frequency of measuring the inter-vehicle distance by the inter-vehicle distance measuring means 50, the correction amount calculated by the correction amount determining means 52 is preserved in a correction amount preserving means 53, such that the correction amount preserved in the correction amount preserving means 53 is used to correct an inter-vehicle distance value measured by the inter-vehicle distance measuring means 50 in the correcting means 54 to output a corrected value of the measured inter-vehicle distance.

Figure 18:
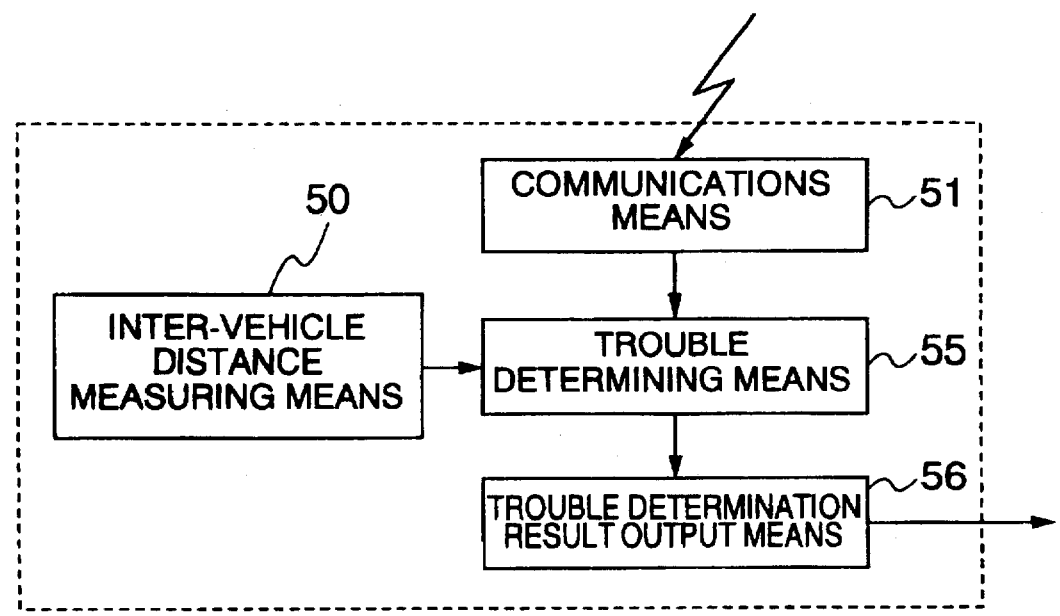
FIG. 18 is a functional block diagram illustrating an inter-vehicle distance measuring apparatus having a function of determining an error in a measured value of the distance between vehicles.

FIG. 18 illustrates a functional block diagram of an inter-vehicle distance measuring apparatus for use in a vehicle which has a function of determining whether a measured inter-vehicle distance value is erroneous based on information external to the vehicle. A communications means for communicating data with the outside through a communication medium such as radio waves, light, and so on receives vehicle distance information from the outside. Vehicle distance information measured by an inter-vehicle distance measuring means 50 is compared with the vehicle distance information received by the communications means 51 by a trouble determining means 55. The trouble determining means 55 determines that any trouble has occurred in the inter-vehicle distance measuring means if a difference between the vehicle distance information received by the communications means 51 and the vehicle distance information measured by the inter-vehicle distance measuring means 50 is larger than a predetermined value. The result of the determination as to whether the inter-vehicle distance measuring means has a trouble or not is informed to the driver through a trouble determination result output means 56.

According to the present invention as described above, since information is captured from an inter-vehicle distance measuring apparatus installed by a road, errors in distance values measured by an inter-vehicle distance measuring apparatus equipped in a vehicle can be corrected based on the captured information. In addition, if an error is too large to be corrected, a trouble in the inter-vehicle distance measuring apparatus equipped in the vehicle can be detected.

We claim:

1. An inter-vehicle distance measuring apparatus for a automotive vehicle comprising:

a communications unit for receiving inter-vehicle data transmitted from an inter-vehicle data measuring and transmitting system installed by a road or in the surface of the road for measuring and transmitting inter-Vehicle data related to a distance between a vehicle in front and a host vehicle;

inter-vehicle distance measuring means for measuring a distance between the vehicle in front and the host vehicle;

correction amount determining means for calculating a correction amount for correcting the distance between the front vehicle and the host vehicle measured by said inter-vehicle distance measuring means based on said measured distance between the vehicle in front and the host vehicle and the inter-vehicle data received by said communications means; and inter-vehicle distance correcting means, for correcting the distance between the vehicle in front and the host vehicle measured by said inter-vehicle distance measuring means, based on the correction amount calculated by said correction amount determining means.

2. An inter-vehicle distance measuring apparatus for an automotive vehicle according to claim 1, further comprising:

correction amount preserving means for preserving the correction amount calculated by said correction amount determining means, wherein said inter-vehicle distance correcting means corrects the distance between the vehicle in front and the host vehicle measured by said inter-vehicle distance measuring means, based on the correction amount preserved in said correction amount preserving means.

3. An inter-vehicle distance measuring apparatus for an automotive vehicle according to claim 1, wherein:

said inter-vehicle data is inter-vehicle distance data representative of the distance between said vehicle in front and said host vehicle.

4. An inter-vehicle distance measuring apparatus for an automotive vehicle according to claim 1, wherein:

said inter-vehicle data is inter-vehicle time difference data related to a difference in time between the time said vehicle in front has passed at a predetermined position on the surface of the road and the time said host vehicle has passed at the same position.

5. An inter-vehicle distance measuring apparatus for an automotive vehicle according to claim 4, wherein said correction amount determining means includes:

vehicle velocity detecting and storing means for detecting and storing a vehicle velocity;

inter-vehicle distance calculating means for calculating the distance between the vehicle in front and the host vehicle based on vehicle velocity data stored in said vehicle velocity detecting and storing means and the inter-vehicle time difference data received by said communications unit; and means for calculating a correction amount for correcting the distance between the vehicle in front and the host vehicle measured by said inter-vehicle distance measuring means, based on the distance between the vehicle in front and the host vehicle calculated by said inter-vehicle distance calculating means.

6. An inter-vehicle distance measuring apparatus for an automotive vehicle according to claim 1, further comprising:

error detecting means for detecting an error between the distance between the vehicle in front and the host vehicle measured by said inter-vehicle distance measuring means and a distance between the vehicle in front and the host vehicle based on the inter-vehicle data received by said communications means; and means for determining that said inter-vehicle distance measuring means has a trouble when the error detected by said error detecting means is larger than a predetermined value.

7. An inter-vehicle distance measuring apparatus for an automotive vehicle according to claim 6, further comprising:

means for informing the existence of a trouble when said trouble determining means determines that said inter-vehicle distance measuring means has the trouble.

8. An inter-vehicle distance measuring apparatus for an automotive vehicle according to claim 1, wherein:

said inter-vehicle data further includes vehicle-in-front existence data representing that said vehicle in front exists within a predetermined range.

9. An inter-vehicle distance measuring apparatus for an automotive vehicle according to claim 8, wherein said inter-vehicle distance measuring means includes means for detecting that said vehicle in front exists.

10. An inter-vehicle distance measuring apparatus for an automotive vehicle according to claim 9, further comprising:

means for determining that said inter-vehicle distance measuring means has a trouble when one of said inter-vehicle data from said communications means and the data detected by said vehicle-in-front existence detecting means indicates the existence of a vehicle in front, while the other does not indicate the existence of the vehicle in front.

11. An inter-vehicle distance measuring apparatus for an automotive vehicle according to claim 10, further comprising:

means for informing the existence of a trouble when said trouble determining means determines that said inter-vehicle distance measuring means has the trouble.

12. An inter-vehicle distance measuring apparatus for an automotive vehicle according to claim 1, further comprising:

inclination detecting means for detecting an inclination of said inter-vehicle distance measuring means from a correct mounting angle; and means for informing when an inclination detected by said inclination detecting means exceeds a predetermined angle.

13. An inter-vehicle distance measuring apparatus for an automotive vehicle according to claim 12, wherein:

said inclination detecting means includes an acceleration sensor.

14. An inter-vehicle distance measuring apparatus for an automotive vehicle according to claim 13, wherein:

said inclination detecting means detects an output of said acceleration sensor when the host vehicle remains stationary.

15. An inter-vehicle distance measuring apparatus for an automotive vehicle according to claim 14, wherein:

said inclination detecting means includes means for calculating a moving average of a multiplicity of outputs detected by said acceleration sensor, and outputs the moving average as the inclination of said inter-vehicle distance measuring means.

16. An inter-vehicle distance measuring apparatus for an automotive vehicle comprising:

a communications unit for receiving a reference signal transmitted from external transmitting means;

inter-vehicle distance measuring means for measuring a time difference from the time a measuring signal is transmitted to the time said measuring signal, reflected back from a vehicle in front, is received by counting clock signals from a clock signal generator to measure a distance between said vehicle in front and a host vehicle; and means for correcting the period of said clock signal generated by said clock signal generator of said inter-vehicle distance measuring means, based on said reference signal received by said communications unit.

17. An inter-vehicle distance measuring-apparatus for an automotive vehicle according to claim 16, wherein said clock signal period correcting means includes:

means for comparing a signal based on said reference signal and said clock signal to detect an error portion in said clock signal; and means for correcting the period of the clock signal generated by said clock signal generator based on the error portion detected by said error portion detecting means.

18. An inter-vehicle distance measuring apparatus for an automotive vehicle according to claim 16, wherein:

said reference signal is a signal at a predetermined frequency.

19. An inter-vehicle distance measuring apparatus for an automotive vehicle according to claim 16, further comprising:

inclination detecting means for detecting an inclination of said inter-vehicle distance measuring means from a correct mounting angle; and means for informing when an inclination defected by said inclination detecting means exceeds a predetermined angle.

20. An inter-vehicle distance measuring apparatus for an automotive vehicle according to claim 19, wherein:

said inclination detecting means includes an acceleration sensor.

21. An inter-vehicle distance means apparatus for an automotive vehicle according to claim 20, wherein:

said inclination detecting means detects an output of said acceleration sensor when the host vehicle remains stationary.

22. An inter-vehicle distance measuring apparatus for an automotive vehicle according to claim 21, wherein:

said inclination detecting means includes means for calculating a moving average of a multiplicity of outputs detected by said acceleration sensor, and outputs the moving average as the inclination of said inter-vehicle distance measuring means.

23. An inter-vehicle distance measuring apparatus for an automotive vehicle comprising:

means for previously storing a position on a road at which marker means placed at a predetermined position by the road or on the road exists and a fixed distance from said predetermined position to a target member;

position detecting means for detecting said predetermined position based on said marker means;

inter-vehicle distance measuring means for measuring a distance between a vehicle in front and a host vehicle as well as for measuring a distance between said target member and the host vehicle;

correction amount determining means for calculating a correction amount used to correct the distance to said target member measured by said inter-vehicle distance measuring means based on said fixed distance stored in said storing means, when said position detecting means detects said predetermined position; and inter-vehicle distance correcting means for correcting the distance between the vehicle in front and the host vehicle measured by said inter-vehicle distance measuring means based on the correction amount calculated by said correction amount determining means.

24. An inter-vehicle distance measuring apparatus for an automotive vehicle according to claim 23, further comprising:

correction amount preserving means for preserving the correction amount calculated by said correction amount determining means, wherein said inter-vehicle distance correcting means corrects the distance between the vehicle in front and the host vehicle measured by said inter-vehicle distance measuring means, based on the correction amount preserved in said correction amount preserving means.

25. An inter-vehicle distance measuring apparatus for an automotive vehicle according to claim 23, further comprising:

error detecting means for detecting an error between the distance between the vehicle in front and the host vehicle measured by said inter-vehicle distance measuring means and a distance between the vehicle in front and the host vehicle based on the inter-vehicle data received by said communications unit; and means for determining that said inter-vehicle distance measuring means has a trouble when the error detected by said error detecting means is larger than a predetermined value.

26. An inter-vehicle distance measuring apparatus for an automotive vehicle according to claim 25, further comprising:

means for informing the existence of a trouble when said trouble determining means determines that said inter-vehicle distance measuring means has the trouble.

27. An inter-vehicle distance measuring apparatus for an automotive vehicle according to claim 23, wherein:

said storing means is located within a memory for storing map information for a navigation unit for storing said marker means existing position and said fixed distance at a position corresponding to said map information.

28. An inter-vehicle distance measuring apparatus for an automotive vehicle according to claim 23, wherein:

said inter-vehicle distance measuring means includes means for detecting an object in front by scanning in the horizontal direction.

29. An inter-vehicle distance measuring apparatus for an automotive vehicle according to claim 28, wherein:

said inter-vehicle distance measuring means is means for measuring a distance to the target member placed by the road when said position detecting means detects said predetermined position.

30. An inter-vehicle distance measuring apparatus for an automotive vehicle according to claim 23, further comprising:

inclination detecting means for detecting an inclination of said inter-vehicle distance measuring means from a correct mounting angle; and means for informing when an inclination detected by said inclination detecting means exceed a predetermined angle.

31. An inter-vehicle distance measuring apparatus for an automotive vehicle according to claim 30, wherein:

said inclination detecting means includes an acceleration sensor.

32. An inter-vehicle distance measuring apparatus for an automotive vehicle according to claim 31, wherein:

said inclination detecting means detects an output of said acceleration sensor when the host vehicle remains stationary.

33. An inter-vehicle distance measuring apparatus for an automotive vehicle according to claim 32, wherein:

said inclination detecting means includes means for calculating a moving average of a multiplicity of outputs detected by said acceleration sensor, and outputs the moving average as the inclination of said inter-vehicle distance measuring means.

34. An inter-vehicle distance measuring method for an automotive vehicle comprising the steps of:

receiving inter-vehicle data related to a distance between a vehicle in front and a host vehicle, transmitted from an inter-vehicle data measuring and transmitting apparatus installed by a road or in the surface of the road;

measuring a distance between the vehicle in front and the host vehicle;

calculating a correction amount for correcting said measured distance between the vehicle in front and the host vehicle based on said measured distance between the vehicle in front and the host vehicle and said received inter-vehicle data; and correcting said measured distance between the vehicle in front and the host vehicle based on said calculated correction amount.

35. An inter-vehicle distance measuring method for an automotive vehicle according to claim 34, further comprising the step of:

preserving said correction amount, wherein said inter-vehicle distance correcting step corrects said measured distance between the vehicle in front and the host vehicle based on said preserved correction amount.

36. An inter-vehicle distance measuring method for an automotive vehicle according to claim 34, wherein:

said inter-vehicle data is inter-vehicle distance data representing a distance between said vehicle in front and said host vehicle.

37. An inter-vehicle distance measuring method for an automotive vehicle according to claim 34, wherein:

said inter-vehicle data is inter-vehicle time difference data related to a time difference between the time said vehicle in front has passed at a predetermined position on the surface of the road and the time said host vehicle has passed at the same position.

38. An inter-vehicle distance measuring method for an automotive vehicle according to claim 37, wherein said correction amount calculating step includes the steps of:

detecting and storing a vehicle velocity;

calculating the distance between the vehicle in front and the host vehicle based on the vehicle velocity data stored at said vehicle velocity detecting and storing step and said received inter-vehicle time difference data; and calculating a correction amount for correcting the distance between the vehicle in front and the host vehicle measured at said inter-vehicle distance measuring step based on the distance between the vehicle in front and the host vehicle calculated at said inter-vehicle distance calculating step.

39. An inter-vehicle distance measuring method for an automotive vehicle according to claim 34, further comprising the steps of:

detecting an error between the distance between the vehicle in front and the host vehicle measured by said inter-vehicle distance measuring means and a distance between the vehicle in front and the host vehicle based on the inter-vehicle data received by said communications means; and determining that said inter-vehicle distance measuring means has a trouble when the error detected by said error detecting means is larger than a predetermined value.

40. An inter-vehicle distance measuring method for an automotive vehicle according to claim 39, further comprising the step of:

informing the existence of a trouble when the trouble is determined at said trouble determining step.

41. An inter-vehicle distance measuring method for an automotive vehicle, comprising the steps of:

previously storing a position on a road at which marker means placed at a predetermined position by the road or on the road exists and a fixed distance from said predetermined position to a target member;

detecting said predetermined position based on said marker means;

measuring a distance to said target member when said predetermined position is detected at said detecting step;

calculating a correction amount used to correct the distance between said marker means and said target member measured at said target measuring step, based on said fixed distance stored at said storing step;

measuring a distance between a vehicle in front and a host vehicle; and correcting the distance between the vehicle in front and the host vehicle measured at said inter-vehicle distance measuring step, based on the correction amount calculated at said correction amount calculating step.

42. An inter-vehicle distance measuring method for an automotive vehicle according to claim 41, further comprising the step of:

preserving the correction amount calculated at said correction amount determining step, wherein said inter-vehicle distance correcting step corrects the distance between the vehicle in front and the host vehicle measured at said inter-vehicle distance measuring step, based on the correction amount preserved at said correction amount preserving step.

43. An inter-vehicle distance measuring method for an automotive vehicle according to claim 42, further comprising the steps of:

calculating an error between the distance between the vehicle in front and the host vehicle measured by said inter-vehicle distance measuring step and the distance between the marker means and the target member measured at said target measuring step; and determining that said measured distance between the vehicle in front and the host vehicle is erroneous when the error detected at said error detecting step is larger than a predetermined value.

44. An inter-vehicle distance measuring method for an automotive vehicle according to claim 41, wherein:

said storing step stores said marker means existing position and said fixed distance in a memory for storing map information for a navigation unit in a storage area corresponding to said map information.

45. An inter-vehicle distance measuring method for an automotive vehicle according to claim 44, wherein:

said predetermined position detecting step includes the steps of:

detecting that the host vehicle is approaching said marker means existing position by said navigation unit; and detecting said marker means after detecting the approaching of the host vehicle to said marker means existing position at said marker approach detecting step.

* * * * *